United States Patent [19]

Tatsuno

[11] Patent Number: 4,972,422

[45] Date of Patent: Nov. 20, 1990

[54] SECOND HARMONIC GENERATOR AND INFORMATION PROCESSING SYSTEM USING THE SAME

[75] Inventor: Kimio Tatsuno, Kodaira, Japan

[73] Assignee: Hitachi, Ltd., Tokyo, Japan

[21] Appl. No.: 408,537

[22] Filed: Sep. 18, 1989

[30] Foreign Application Priority Data

Sep. 19, 1988 [JP] Japan .................................. 63-232378

[51] Int. Cl.⁵ ............................................... H01S 3/10
[52] U.S. Cl. ....................................... 372/22; 372/64; 307/427; 350/96.12; 350/96.15
[58] Field of Search ............................. 372/21, 22, 64; 307/425–427; 350/96.12, 96.15

[56] References Cited

U.S. PATENT DOCUMENTS

| 4,820,011 | 1/1989 | Umegaki et al. | 350/96.15 |
| 4,830,447 | 5/1989 | Kamiyama et al. | 350/96.12 |
| 4,838,638 | 6/1989 | Kammama et al. | 307/427 |
| 4,856,006 | 8/1989 | Yano et al. | 372/21 |
| 4,862,473 | 8/1989 | Yano et al. | 372/22 |

Primary Examiner—Léon Scott, Jr.
Attorney, Agent, or Firm—Fay, Sharp, Beall, Fagan, Minnich & McKee

[57] ABSTRACT

A system for increasing frequency of a laser beam utilizes focused Cherenkov radiation. The system utilizes reflective/refractive properties of contiguous optics to achieve increased frequency, which provides a mechanism for alloy for increased density in such applications as optical disk technology.

17 Claims, 7 Drawing Sheets

SECOND HARMONIC GENERATOR AND INFORMATION PROCESSING SYSTEM USING THE SAME

BACKGROUND OF THE INVENTION

The present invention relates to a second harmonic generator which utilizes Cherenkov radiation that is useful as a source of coherent short-wave light. Such light is useful for optical reading or recording, such as in optical disks, laser printers or color printers. Such devices benefit from light having a higher frequency, and correspondingly, a lower wavelength. Shorter wavelength light provides for example, increased resolution in laser printers, and increased data density in optical disks.

It has been recognized that notwithstanding the limited optical frequency spectra obtainable from current semiconductor laser devices, such limitations may be remediable by utilization of a phenomenon in which waves having a phase velocity greater than the phase velocity of a medium radiate energy into the medium at a given angle (Cherenkov angle).

There has heretofore been known technology for generating second harmonic of Cherenkov radiation by forming a non-linear optical organic material into fiber form and inputting a coherent primary light thereto, as reported in the Nonlinear Optical Materials—Extended Abstract, 1985, p. 97. The radiant beam, however, has the shape of a cone and cannot be focused into a good spot, presenting a problem in utilization of the radiant beam, especially in light of the fact that only a small fraction of total laser energy forms the radiant beam.

Generation of second harmonics by Cherenkov radiation from waveguides using lithium niobate (LiNbO$_3$) as a substrate, has been reported in CLEO '87 Technical Digest, pp. 198. This method has many advantages in that the secondary light having a wavelength one-half that of the fundamental light can be generated. This method simultaneously maintains a high conversion efficiency. Phases of the primary and secondary light also have different wavelengths which can be matched relatively easily. With this method, however, a radiation mode is established from a narrow line-shaped waveguide into the substrate, whereby the light diverges in the direction of radiation while the light is collimated in parallel in the direction at right angles thereto. Accordingly, the wave front is distorted. Therefore, the light cannot be focused to a point maintaining diffraction limited wave front accuracy, which is a fatal defect that hinders the application to optical recording or reading, such as optical disks or laser printers.

Such an earlier method is shown in FIG. 4. Therein, the substrate of the waveguide consisted simply of a block having a flat surface. The beam that has passing through the substrate develops large aberration, but no means for correcting the aberration had ever been employed.

The subject invention remedies all the above-referred problems, and others, and recognizes in that the above-mentioned technologies, a problem resided in that attention had not been sufficiently given to beam formation.

SUMMARY OF THE INVENTION

The present invention provides a second harmonic wave generator which is compact in size, which is capable of directly modulating the light intensity, and which generates a coherent beam of short wavelengths that is collimated, maintaining a high flatness.

According to the present invention, an optical system is added in which an aberration correction function or a beam shaping function is given to the waveguide substrate or to the cladded portion of the fiber in order to improve the flatness of the wave front formed by the beam that is emitted, and to focus the beam through a lens into a spot of a diffraction limit.

That is, the second harmonic Cherenkov beam obtained from the fibrous waveguide made of non-linear optical material has the wave front, i.e., has an equiphase front of wave motion, that assumes a conical shape with the fiber as a center line. The presence of ray at right angles with the conical wave front is apparent from Malus's theory. However, it is one of the objects of the present invention to have these rays travel in parallel with each other along the center lines of the fibers.

First means therefor is based on Snell's law that applies when a ray of light passes through a boundary of media having dissimilar indices of refraction. That is, a first point of the present invention is to use a conical prism as, will be described in more detail below, to convert a conical wave front into a parallel plane wave. Such a means is suitably applied to the fiber-type Cherenkov beam. The system is also suitably applied to a waveguide type Cherenkov beam which appears as if the fiber-type Cherenkov beam is divided into two. In this case, the cone is halved, as a matter of course.

A second embodiment of the present invention applies the law of reflection, in contrast with the application of refraction utilized above. That is, the fiber the clad of the waveguide, or the substrate, is fashioned such that it has a totally internal reflective surface with a conical or hemi-conical shape, expanding in the direction in which the ray of light travels. Further, the angle relative to the center line of the conical axis is so defined that the ray of light totally reflected, and all becomes in parallel with the waveguide.

A third embodiment of the present invention provides that fiber clads formed in a conical shape, as mentioned above, or the second harmonic Cherenkov beam generating portions formed in the waveguide substrate, are arranged in a plural number. These were thus far arranged singly. The lasing phases among the Cherenkov beams are then coupled together to obtain coherent beams. This embodiment provides an even great optical output. That is, by adding the first point or the second point and the third point, it is made possible to realize a second harmonic optical source capable of focusing a ray into a single spot, close to the diffraction limit, yet maintaining a large output.

To obtain Cherenkov rays in the form of parallel beams according to the first embodiment of the present invention, i.e., according to the law of light ray refraction, Snell's law should be taken into consideration on a plane that includes fibers or waveguides for generating Cherenkov beams. If a Cherenkov beam angle is denoted by $\alpha$, an incident angle of beam and refraction angle at the clad face are denoted by i and j, a refractive index of the clad is denoted by n, and a vertical angle of the cone is denoted by $\Phi$ as shown in FIG. 2 or 3, there holds the following relationship according to Snell's law, i.e., $$n(\sin i) = \sin j$$

Furthermore, the vertical angle $\Phi$ of the cone is found from the following relationship, $$\Phi = 90° - j$$

under the condition where the ray of light after refracted becomes in parallel with the waveguide, i.e., $$\Phi = 90° - \mathrm{Tan}^{-1}[\sin \alpha/(\cos \alpha - 1/n)]$$

Conversely, if the vertical angle $\Phi$ of the cone is determined as described above, the Cherenkov beam becomes a parallel beam after the refraction and can be focused upon one point. To obtain Cherenkov rays which are all in parallel according to the second point of the present invention, i.e., according to the law of reflection of light beam, on the other hand, the law of reflection is applied on a plane that includes the fibers or waveguides. As shown in FIG. 5, the beam radiated at a Cherenkov angle $\alpha$ is totally reflected by the back face of the waveguide to satisfy the law of reflection $i' = j'$. In this case, the back face is formed in a conical shape, and the angle $\tau$ subtended by the vertical angle of the cone, i.e., subtended by the axis of the waveguide and by the generatrix is selected to be:

$$\tau = i' = j' = \tfrac{1}{2}\alpha$$

whereby the reflected rays of light all become parallel with the waveguides. With the substrate being shaped as described above, there are obtained parallel plane waves which can be focused through a lens into a point maintaining a diffraction limit.

BRIEF DESCRIPTION OF THE DRAWINGS

The invention will be described in conjunction with certain drawings which are for the purpose of illustrating the preferred and alternate embodiments of the invention only, and not for the purposes of limiting the same, and wherein:

FIG. 1 is a diagram illustrating an embodiment of the present invention, wherein

FIG. 2 is a diagram illustrating a second embodiment of the present invention, wherein

FIG. 3 is a diagram illustrating a third embodiment of the present invention, wherein

FIG. 5 is a diagram illustrating a fourth embodiment of the present invention, wherein

FIG. 6 is a diagram illustrating a fifth embodiment of the present invention, wherein

FIG. 7 is a diagram illustrating a sixth embodiment of the present invention, wherein

Detailed Description of the Preferred and Alternate Embodiments

Figure 1A:
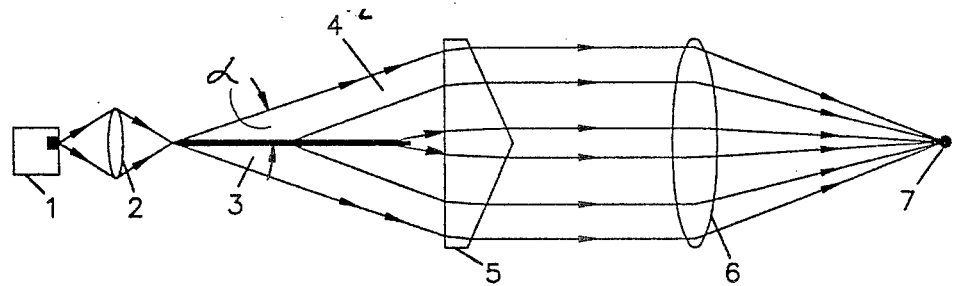
FIG. 1(a) is a side view and FIG. 1(b) is a view showing the appearance of a cone prism.
Figure 1B:
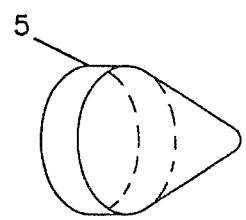

Referring now to the figures, it will be seen that FIG. 1 illustrates an embodiment wherein a semiconductor laser 1 serves as a fundamental optical source. The beam from the fundamental optical source is focused through a lens, imaged, and is communicated to a waveguide or face of a fiber 3 comprised of a non-linear optical material including a generally linear portion which has a characteristic response of polarization to an induced electric field. A polarization wave is then induced in the fiber 3. When the phase speed becomes faster than the phase speed of the medium, a polarization wave is radiated as a so-called Cherenkov radiation 4 which is, usually, a blue light having a wavelength one-half that of the fundamental input light, maintaining an angle $\alpha$. Such a beam diverges with its equiphase surface being in a conical shape. If such a beam is focused through a conical prism 5 having a vertex in the direction in which light travels, the ray of light that has passed through the prism 5 becomes parallel in the direction of the fiber 3, converted into a parallel plane wave which is focused through a focusing lens 6 into a spot 7 of a diffraction limit.

Figure 2A:
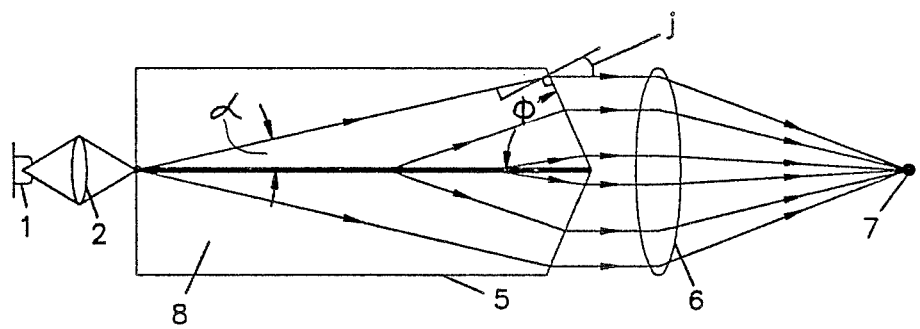
FIG. 2(a) is a side view and FIG. 2(b) is a view showing the appearance of a fiber clad portion.
Figure 2B:
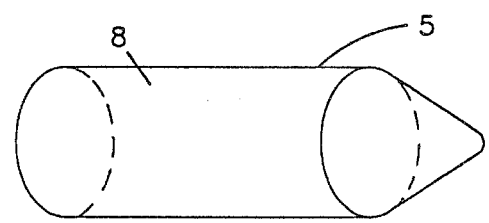

FIG. 2 illustrates a second embodiment of the present invention. That is, in the embodiment shown in FIG. 1, the clad 8 that surrounds the fiber 3 has an increased diameter and is formed contiguously with cone prism 5 as a unitary structure. For example, when $\alpha = 16°$ and $\Phi = 67°$, it is possible that a collimated beam can be acquired.

Figure 3A:
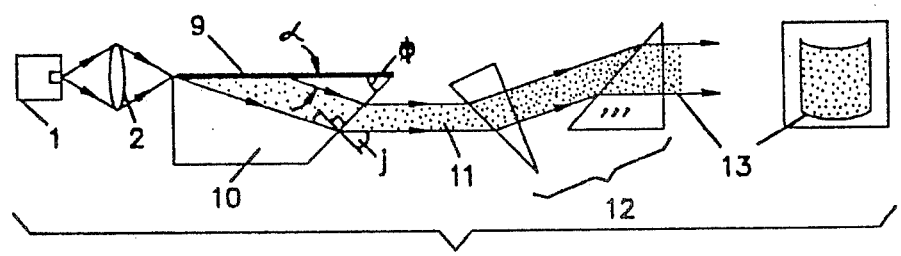
FIG. 3(a) is a side view and FIG. 3(b) is a view showing the appearance of a waveguide substrate.
Figure 3B:
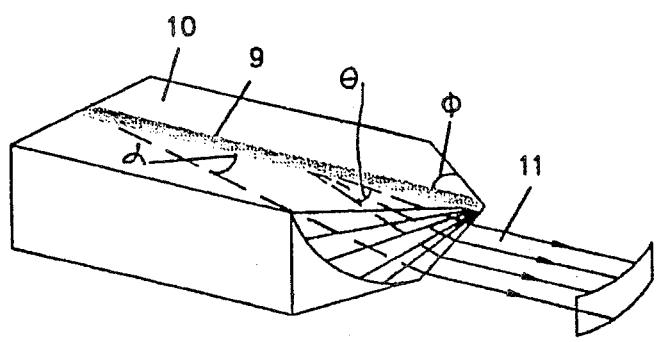

FIG. 3 illustrates a third embodiment of the present invention. In this embodiment, waveguide 9 for generating second harmonics is formed on a non-linear optical crystal 10, and a Cherenkov radiation beam is collimated through an optical system. That is, the beam from the semiconductor laser 1 is focused and imaged through a lens 2, and is permitted to be incident upon the incident face of the waveguide 9. The fundamental light generates polarization wave in the waveguide 9 and whereby the Cherenkov beam is radiated maintaining an angle $\alpha$ with lateral divergence angle of $\Phi$. At this moment, the front (exit face) of the substrate 10 of the waveguide 9 assumes a conical shape that is cut into a half as shown in FIG. 3(b). A vertical angle $\Phi$ of the conical shape (angle subtended by the axis and the generatrix) is calculated by the method described above. Thus, there is obtained a beam 11 that is collimated as a parallel light. Depending upon the sizes of the waveguide 9 and the substrate 10, however, the beam 11 may have an anisotropic distribution of intensities. In such a case, use is made of a single or a plurality of anamorphic prisms 12 to shape the beam, whereby there is obtained a plane wave 13 which has an isotropic intensity distribution, which has neat phases, and which has small aberration. Such a beam can be focused into one point of a diffraction limit.

Figure 4:
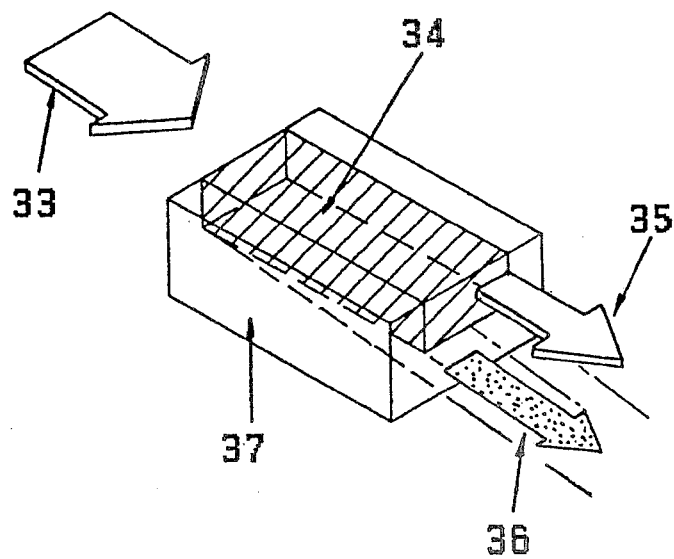
FIG. 4 is a diagram illustrating a conventional example of a Cherenkov wave generator.

FIG. 4 is a diagram illustrating a conventional example lacking any aberration correction for the Cherenkov radiated second harmonics; i.e., blue light is only obtained. This example cannot be applied to a diffraction limit optical system such as optical disks or laser printers.

Figure 5A:
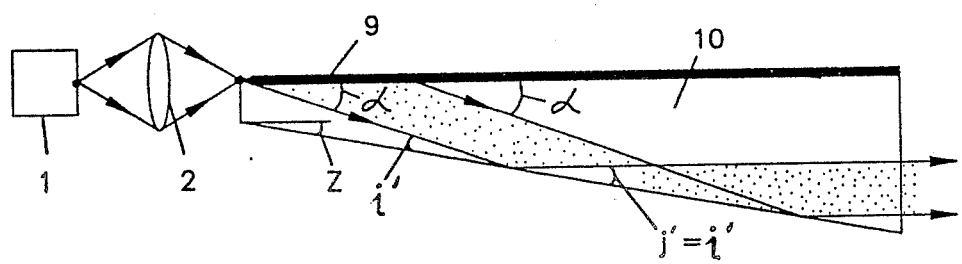
FIG. 5(a) is a side view.
Figure 5B:
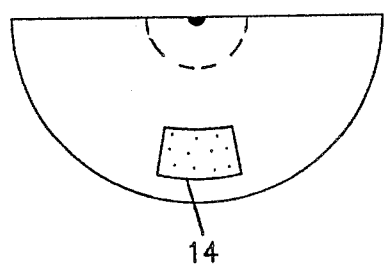
FIG. 5(b) is a front view and FIG. 5(c) is a view showing the appearance of a waveguide substrate.
Figure 5C:
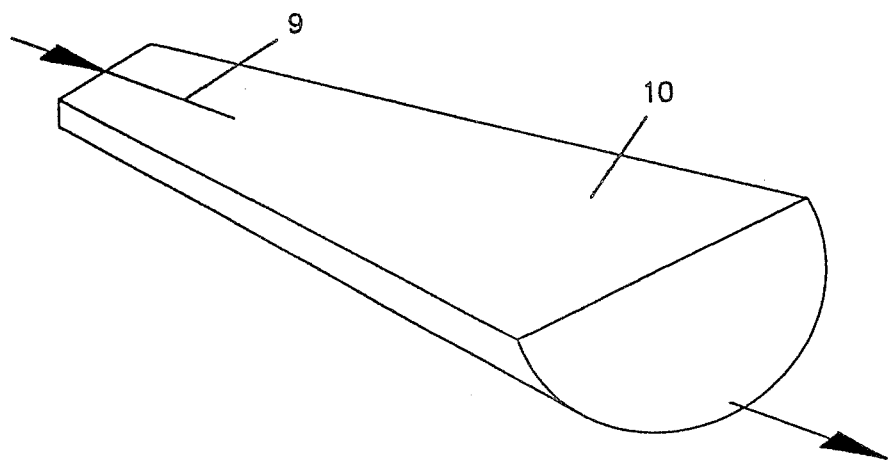

The afore-mentioned embodiments were to obtain a parallel beam by utilizing a first point of the present invention, i.e., by utilizing the law of refraction of rays. Described below is an embodiment for collimating the Cherenkov beam by the law of reflection. That is, as shown in FIG. 5, the Cherenkov beam is once totally reflected by the back face of the waveguide substrate 10. The inclination of the back surface is then so determined that the ray of light reflected becomes parallel with the waveguide 9. As this holds true for all Cherenkov beams, the reflected beams must become parallel in all cross sections that include the waveguides 9. For this purpose, therefore, the back face must have a conical shape as shown in FIG. 5(b). In this case, the vertical angle of the cone (angle subtended by the axis of the cone and the generatrix) $\tau$ is determined to be, $$\tau = i' = j' = \tfrac{1}{2}\alpha$$

under the condition where the direction of the waveguide 9 is in parallel with the reflected beam.

According to this embodiment, furthermore, the distribution of intensities can also be shaped. By defining the length of the waveguide 9 and the radius of the cone, it is allowed to form a beam 14 that has nearly a isotropic intensity distribution. The beam shaping is in no way limited to this method only, but the method of utilizing the prism described with reference to FIG. 3 can also be applied.

Described below is a method of increasing the optical output of the secondary harmonic Cherenkov beam that is formed by collimating the thus obtained highly parallel plane waves. This forms another aspect of the present invention. That is, one of the waveguide or the fiber which consists of a single stripe has a limitation in wavelength conversion ability. Therefore, the waveguides are arranged in a plural number. Here, it can be contrived to broaden the width of the waveguide. In this case, however, the transverse modes of high orders also generate in the waveguide, and there are formed nonuniform far fields of Cherenkov beam, making it difficult to obtain a single mode. Therefore, the waveguides for holding the single mode are arranged in a plural number to obtain an optical output that is increased by their number.

Figure 6A:
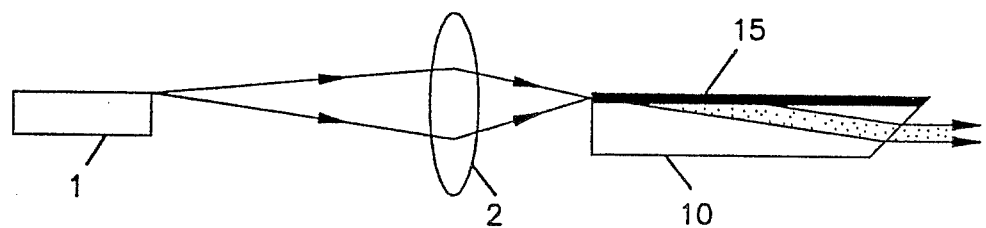
FIG. 6(a) is a side view.
Figure 6B:
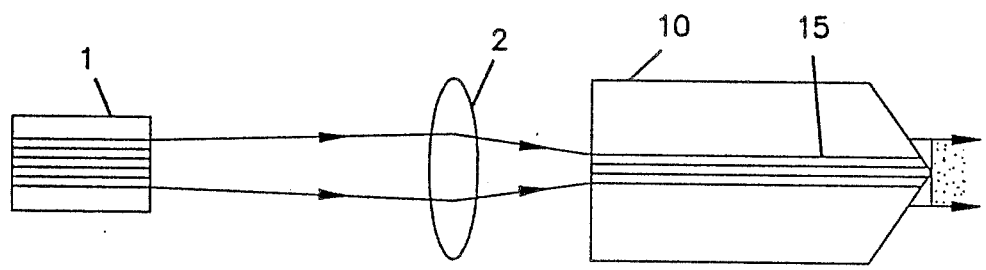
FIG. 6(b) is a plan view and FIG. 6(c) is a view showing a case of employing a fibers or waveguides.
Figure 6C:
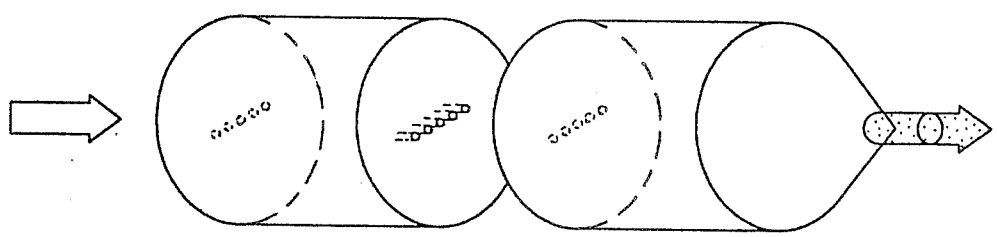

A fifth embodiment of the present invention will now be described with reference to FIG. 6. That is, a beam from a semiconductor laser 1 is focused through a lens 2 to form an image which is then permitted to be incident on the waveguides 15 arranged like an array. At this moment, the waveguide substrate 10 has a conical front face or back face as shown in FIGS. 3 or 5. Such fabrication makes it possible to obtain a second harmonic output greater than that of when a single waveguide is used. It need not be mentioned that enhanced effects are obtained even when semiconductor lasers are arranged like an array to form a fundamental optical source having a large output. Likewise, the fibers are also arranged like an array (FIG. 6(c)). In either case, the phases must be coupled among the waveguides or fibers. Accordingly, the waveguide array or fiber array generates second harmonic Cherenkov beams coherently relative to each other.

Figure 7A:
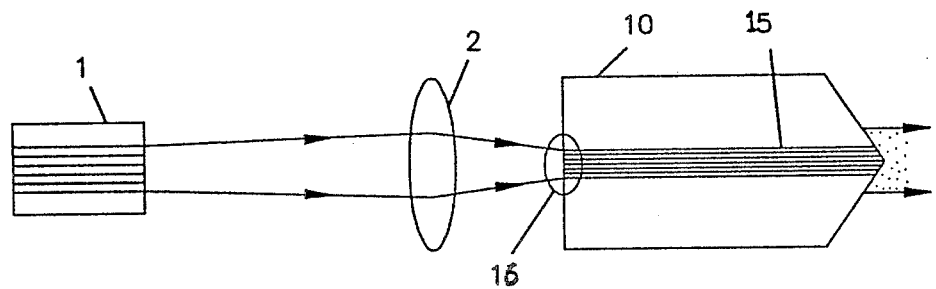
FIG. 7(a) is a plan view and FIGS. 7(b), 7(c) and 7(d) are views illustrating a phase correcting portion on an enlarged scale.
Figure 7B:
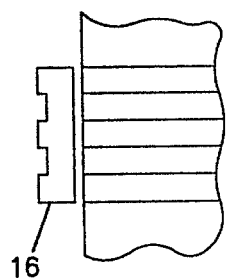
Figure 7C:
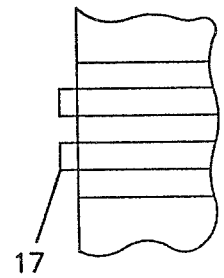
Figure 7D:
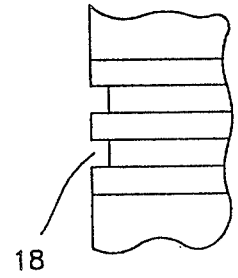

Therefore, consideration must be given either to the case where the laser oscillations from the fundamental semiconductor laser array have phases that are deviated by $\Phi$ relative to the neighboring ones. In such a case, a phase corrector 16 is installed between the semiconductor laser array and the waveguide array for generating secondary harmonics, as shown in the embodiment of FIG. 7(b), or phase corrector 17 or 18 is formed on the face of the waveguide array as shown in the embodiment of FIGS. 7(c) or 7(d). This functions to completely render uniform the phases of the laser beam incident upon the waveguide array. This makes it possible to render quite uniform the phases of second harmonics in the obtained Cherenkov beam.

Furthermore, if the magnification (reduction ratio) of the lens 2 for forming the image is set to, for example, $\tfrac{1}{2}$, the power density of the incident beam upon the waveguide array becomes four times as great, making it possible to obtain a high wavelength conversion efficiency, which is a feature of this embodiment.

Figure 8:
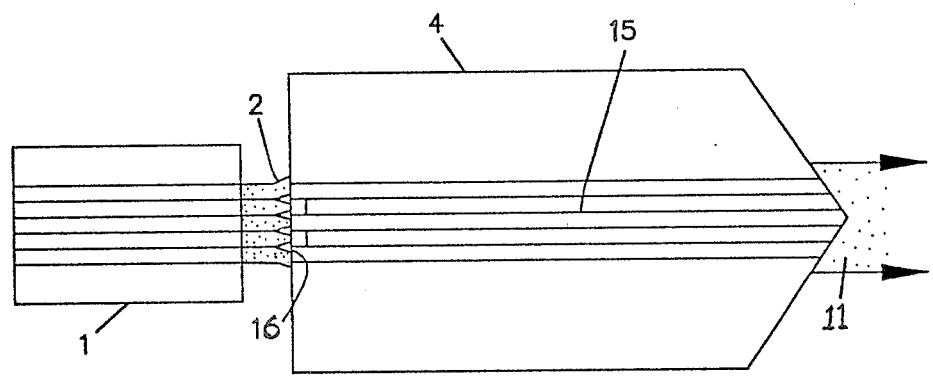
FIG. 8 is a plan view illustrating a seventh embodiment of the present invention.

With reference to FIG. 8, the semiconductor laser array 1 is directly coupled to the waveguide array in order to reduce the size of the whole second harmonic generator.

Figure 9:
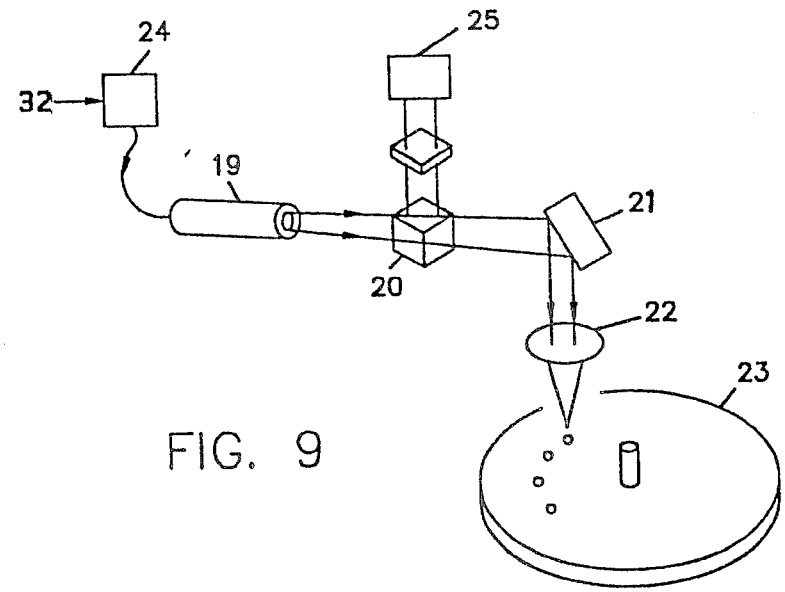
FIG. 9 is a diagram illustrating an embodiment of an optical disk device according to the present invention.

FIG. 9 illustrates an embodiment in which the beam of large output and high quality obtained as described above is used as an optical source for recording and/or reading onto the optical disk. That is, the beam from a second harmonic generator (source of blue light) 19 according to the present invention is permitted to pass through a beam splitter 20 and a mirror 21, and is focused into a tiny spot through a focusing lens 22 to record pits onto an optical disk 23. At this moment, the fundamental semiconductor laser is directly modulated in accordance with modulated signals 32 be recorded by a signal circuit 24. The pits recorded onto the optical disk 23 are read as intensity changes of light reflected from the optical disk. The light is reflected by a beam splitter 20, and is processed by a reproduced signal processing circuit 25.

Figure 10:
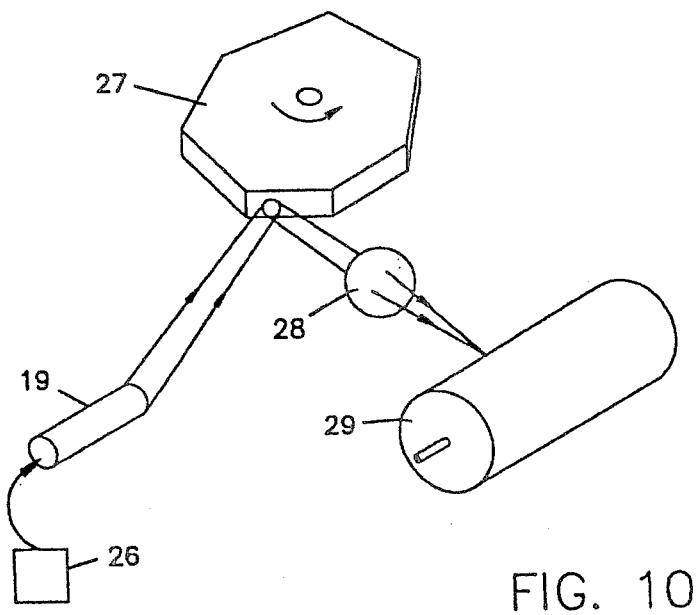
FIG. 10 is a diagram illustrating an embodiment of a laser printer according to the present invention.

FIG. 10 illustrates an embodiment in which the second harmonic generator according to the present invention is used as an optical source for a laser beam printer. That is, the beam directly modulated by the recording signal circuit 26, is scanned by a polygonal mirror 27, and focused into a spot through a scanning lens 28 to scan on the photosensitive drum 29. A negative image formed on the photosensitive drum is transferred by a printing process onto a paper to effect the high-speed printing.

Accordingly, the present invention teaches a system which deals with a Cherenkov-type waveguide or fiber device that generates second harmonics of a high conversion efficiency utilizing high optical power density and that enables phases to be easily adjusted. There is realized a source of short-wavelength coherent light in which a focusing optical source is formed as a unitary structure, such as was not possible thus far, that is small in size, that enables the intensity of light to be directly modified, and that generates coherent light of short wavelengths which is highly planarly collimated.

If such a compact source of short wavelength light that can be directly modulated is used as an optical source for optical disk as shown in FIG. 9, the recording and reproduction can be effected with a wavelength one-half the conventional semiconductor laser wavelength. Therefore, the density for recording data becomes four times as great, or the light output that is required decreases to one-fourth. If the optical source is applied to the laser printer that is shown in FIG. 10, the printing can be carried out maintaining a resolution which is four times as high as that of the conventional art. Sensitivity of the photosensitive drum increases, too. Therefore, the printing can be carried out under favorable conditions such as at high printing speeds. The optical source of short waves according to the present invention finds wide range of applications including not only the aforementioned field of data processing but also the fields of displays and color printers.

The conventional technology for generating second harmonics involves a problem in that the non-linear optical crystal is optically damaged. This stems from the fact that too much attention is given to a high conversion efficiency into the second harmonic and whereby the density of the fundamental light power becomes too great in the waveguide. Therefore, as optical damage develops in the waveguide or in the substrate, the light is absorbed in increased amounts and the output of the second harmonic decreases. According to the present invention, however, the waveguides are arranged in a plural number in the form of an array, and the density of light power is suitably decreased to eliminate the problem of optical damage.

Turning now to FIG. 11, an embodiment providing improved efficiency in generation of a second harmonic wave will be described. It is generally well known that an external cavity resonator for a fundamental beam is effective for increasing efficiency of second harmonic wave generation. Such resonators are readily adaptable to the present invention.

Figure 11A:
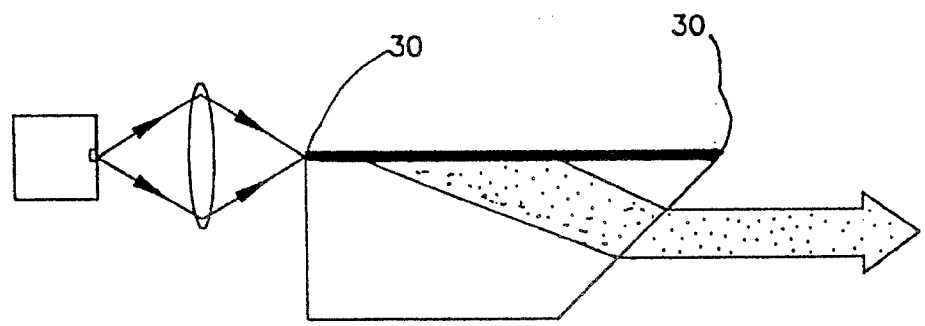
FIG. 11 is a diagram illustrating an embodiment in which an external cavity resonator is utilized for increasing efficiency of second harmonic generation.
Figure 11B:
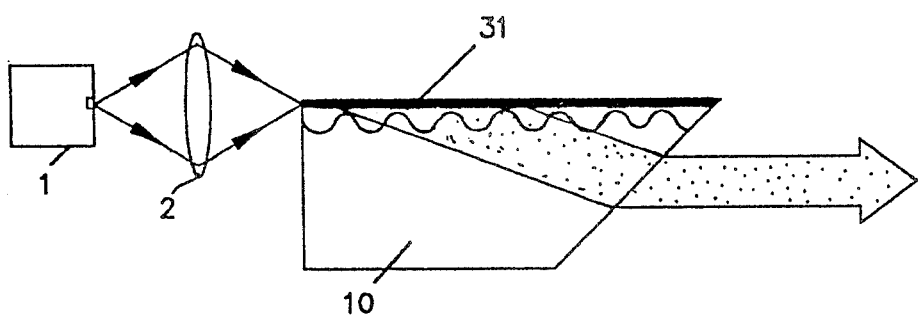

FIG. 11(a) illustrates a Fabry-Perot resonator 30. The resonator 30 is suitably either of the single or plural monolithic type. FIG. 11(b) illustrates incorporation of a Distributed Feedback type resonator 31 in a non-linear crystal. Combinations of the type illustrated in FIG. 11 will provide a good quality wavefront SHG beam with higher power. The increased power allows for higher data rate optical recording systems in such applications as optical discs and laser printers.

The invention has been described with reference to the preferred and alternate embodiments. Obviously, further modification will be apparent upon a reading and understanding of this specification. It is intended that all such modifications be included insofar as they come within the scope of the intended claims or the equivalents thereto.

Having thus described the invention, it is now claimed:

1. A harmonic optical generating system comprising:
   non-linear optical waveguide means including a generally linear interior portion disposed in said waveguide having non-linear characteristics;
   means for receiving coherent light into the non-linear optical waveguide from an associated coherent light generating source;
   means for intercepting harmonic light resultant from exposure of the optical waveguide to said associated coherent light source; and
   said non-linear waveguide means further including collimator means for forming harmonic light having a generally parallel direction of propagation from intercepted harmonic light so as to obtain Cherenkov radiation in the form of generally parallel beams.

2. The harmonic optical generating system of claim 1 wherein:
   the non-linear optical wave guide is generally cylindrical and is adapted for guiding optical light therethrough generally along a longitudinal axis thereof;
   the means for receiving coherent light into the non-linear wave guide includes means for receiving the coherent light generally along the longitudinal axis; and
   the collimator means is conical, such that light of the non-linear optical waveguide is directed generally at a base of the cone with a direction of propagation generally longitudinally of the cone.

3. The harmonic optical generating system of claim 2 wherein the collimator is contiguous with the non-linear optical waveguide; such &hat the non-linear waveguide has a generally cylindrical portion and a generally conical portion longitudinally disposed such that the longitudinal axis of the cylindrical portion extends to form a longitudinal axis of the conical portion.

4. The harmonic optical generating system of claim 1 further comprising a lens means disposed in the harmonic light having a generally parallel direction of propagation, thereby causing the harmonic light having a generally parallel direction of propagation to converge at a focal spot.

5. The harmonic optical generating system of claim 1 wherein:
   the collimator means is comprised of generally concave reflective surface oriented such that an interior portion thereof is generally exterior of the non-linear optical waveguide.

6. The harmonic optical generating system of claim 5 wherein the collimator means is further comprised of a substance generally transparent to the coherent light and wherein the collimator is oriented such that a critical angle between a surface thereof and the coherent light results in total internal reflection.

7. The harmonic optical generating system of claim 6 wherein the collimator means is contiguously formed in an exterior portion of the non-linear optical waveguide.

8. The harmonic optical generating system of claim 1 wherein the means for intercepting harmonic light resultant from exposure of the optical waveguide to a coherent light includes a phase corrector means oriented such that coherent light is passed therethrough prior to entry into the non-linear optical waveguide.

9. The harmonic optical generating system of claim 1 wherein resonator is comprised of at least one of a Fabry-Perot resonator and a distributed feedback resonator.

10. An high-frequency coherent light generating unit comprising:
    a semiconductor laser device for generating generally coherent light which optical waveguide includes a generally linear interior region disposed in said waveguide having non-linear characteristics;
    a means for directing said coherent light from the semiconductor laser device to a non-linear optical waveguide;
    means for intercepting coherent harmonic light radiating from the non-linear optical waveguide; and
    collimator means for forming harmonic light having a generally parallel direction of propagation from said intercepted coherent harmonic light.

11. The high-frequency coherent light generating unit of claim 10 further comprising:

means for directing the harmonic light having a generally parallel direction of propagation to an optical disk.

12. The high-frequency coherent light generating unit of claim 10 further comprising:
    means for directing the harmonic light having a generally parallel direction of propagation to a photosensitive printer drum.

13. A method of generating a coherent optical wave comprising the steps of:
    receiving said coherent light into a non-linear optical waveguide from an associated light generating source;
    intercepting harmonic light resultant from exposure of the optical waveguide to a coherent light; and
    forming, through an optical system, harmonic light having a generally parallel direction of propagation.

14. The method of claim 13 further comprising the steps of:
    guiding optical light through the generally non-linear generally along a longitudinal axis thereof;
    receiving the coherent light generally along the longitudinal axis; and
    the forming step includes the step of directing light of the non-linear optical waveguide generally to a base of a generally conical lens with a direction of propagation generally longitudinally of the cone.

15. The method of claim 14 further comprising the step of focusing the light having a generally parallel direction of propagation such that it tends to converge at a focal spot.

16. The method of claim 15 further comprising the step of focusing the light having a generally parallel direction of propagation on an optical disk.

17. The method of claim 14 further comprising the step of focusing the light having a generally parallel direction of propagation on a photosensitive printer drum.

* * * * *